M. R. GREENLEE.
VALVE.
APPLICATION FILED FEB. 18, 1908
913,491.
Patented Feb. 23, 1909.
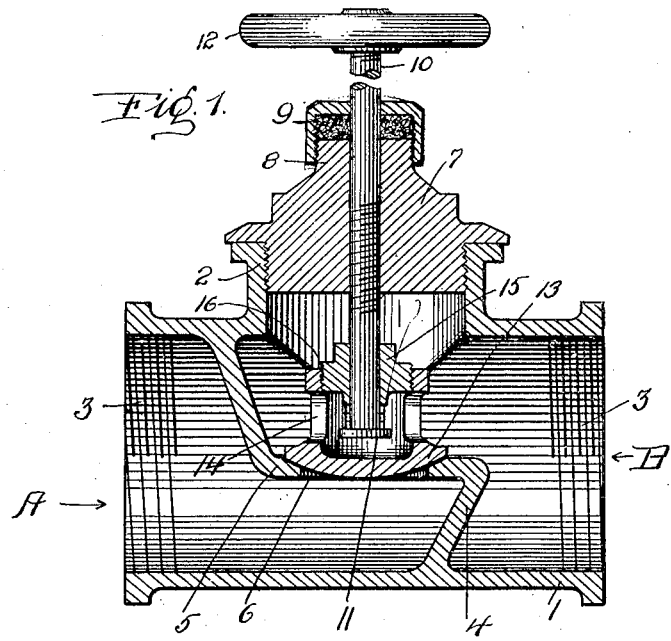
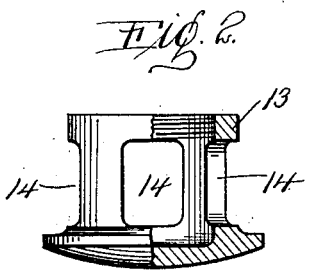
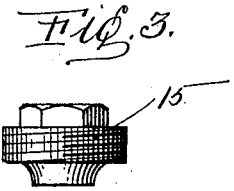
Witnesses
Samuel Payne
L. H. Butler
Inventor
M. R. Greenlee
By H. C. Everts
Attorneys
THE NORRIS PETERS CO., WASHINGTON, D. C.

UNITED STATES PATENT OFFICE.

MORTIMER R. GREENLEE, OF WADESTOWN, WEST VIRGINIA.

VALVE.

No. 913,491. Specification of Letters Patent. Patented Feb. 23, 1909.

Application filed February 18, 1908. Serial No. 416,524.

*To all whom it may concern:*

Be it known that I, MORTIMER R. GREENLEE, a citizen of the United States of America, residing at Wadestown, in the county of Monongalia and State of West Virginia, have invented certain new and useful Improvements in Valves, of which the following is a specification, reference being had therein to the accompanying drawing.

This invention relates to valves, and the primary object of my invention is, to provide a novel valve that can be used as a check valve or as an ordinary straight-way valve.

A further object of my invention is to provide a simple, durable and inexpensive valve that can be easily adjusted, whereby the same can be used for numerous purposes.

With these and other objects in view which will more readily appear as the invention is better understood, the same consists in the novel construction, combination and arrangement of parts to be presently described and then specifically pointed out in the appended claim.

In the drawings: Figure 1 is a vertical sectional view of the valve constructed in accordance with my invention, Fig. 2 is an elevation, partly in section, of a cage used in connection with the valve, and Fig. 3 is an elevation of a cage plug.

In the accompanying drawings, 1 designates a valve body having a right angular interiorly screw threaded extension 2. This valve body is provided with interior threads 3 for the threaded ends of pipes (not shown). The valve body is formed with a partition 4 having a valve seat 5 provided with an opening 6, establishing communication between both ends of the valve body.

In the interiorly threaded extension 2 is detachably mounted a cap 7 having a conventional form of stuffing box 8 closed by a gland 9. Adjustably mounted in the cap 7 is a valve stem 10, provided upon its lower end with a head 11, and upon its upper end with a handle or wheel 12.

Adapted to engage the valve seat 5 and close the opening 6 is a cage 13, said cage having diametrically opposed openings 14 formed therein. The openings 14 are provided to enable the back pressure to operate directly on the upper face of the bottom of the cage for maintaining said bottom in engagement with the valve seat. The said bottom constituting the valve. The cage 13 is slidably mounted upon the valve stem 10 through the medium of a plug 15, this plug being screw threaded in the cage 13, as at 16.

As illustrated in Fig. 1 of the drawings, the valve is in position to be used as a check valve, the head 11 of the valve stem 10 permitting of the cage being elevated, due to a pressure in the direction of the arrow A of Fig. 1 of the drawings. A pressure in the direction of the arrow B seats the cage 13 and prevents the plug from being elevated in the valve body. To prevent a movement of the cage 13, the valve stem 10 is rotated until the head 11 thereof engages the bottom of the cage and prevents its elevation by a pressure in the direction of the arrow A. The cage 13 can be elevated to open the valve, by screwing upwardly upon the valve stem, allowing a clear passage through the opening 6 of the valve seat 5.

It is thought that my invention will be fully understood from the foregoing description, taken in connection with the drawings, and I reserve the right to utilize my valve for various purposes and to make such changes in the structural details thereof as are permissible by the appended claim.

Having now described my invention what I claim as new, is:—

The combination with a valve casing provided with a partition formed with an opening and a valve seat, of a valve adapted to engage said seat, a vertically-extending cage formed integral with the upper face of the valve and of smaller diameter than the diameter of the valve, said cage having its side provided with openings whereby the application of back pressure is had against the upper face of the bottom so as to maintain the valve in engagement with its seat, said cage further having its top formed with a screw threaded opening, an apertured plug having peripheral threads engaging the threads of said top whereby the plug is connected to the cage, and an adjustable valve stem extending through said plug and having its lower end formed with a head of greater diameter than the opening of the plug whereby the stem is prevented from separating from the cage, said stem providing means for retaining the valve on its seat and a guide for the shifting of the cage when the head of the stem is out of engagement with the bottom of the cage.

In testimony whereof I affix my signature in the presence of two witnesses.

MORTIMER R. GREENLEE.

Witnesses:
F. H. MILLAN,
L. H. HAUGHT.